[54] TWO-STAGE ROTARY ENGINE OF TROCHOIDAL TYPE

[75] Inventors: David M. Myers, Upper Saddle River; Charles Jones, Hillsdale, both of N.J.

[73] Assignee: Curtiss-Wright Corporation, Woodridge, N.J.

[22] Filed: June 4, 1973

[21] Appl. No.: 366,605

[52] U.S. Cl. .............................. 123/8.05
[51] Int. Cl. ...................... F02b 53/00, F02b 53/08
[58] Field of Search ........... 123/8.05; 60/15; 418/54

[56] References Cited
UNITED STATES PATENTS

| | | | |
|---|---|---|---|
| 1,636,486 | 7/1927 | Planche | 418/54 |
| 2,791,881 | 5/1957 | Denker | 60/15 |
| 3,139,722 | 7/1964 | Yokoi | 123/8.05 X |

FOREIGN PATENTS OR APPLICATIONS

| | | | |
|---|---|---|---|
| 1,068,209 | 5/1967 | Great Britain | 123/8.05 |

Primary Examiner—Carlton R. Croyle
Assistant Examiner—Michael Koczo, Jr.
Attorney, Agent, or Firm—Raymond P. Wallace

[57] ABSTRACT

A compound rotary engine having a power unit comprising a two-lobed epitrochoidal housing with a three-apexed rotor therein, a compressor unit comprising a one-lobed epitrochoidal housing having a two-apexed rotor therein and feeding compressed gas to the power unit for further compression, and an expansion unit comprising a one-lobed epitrochoidal housing having a two-apexed rotor therein and receiving the partially expanded exhaust from the power unit for further expansion. The three units may be mounted on a common shaft, or may be on separate parallel shafts which are interconnected and turning at the same speed. The system may be operated either as a diesel system with a high over-all volume ratio and compression ignition, or at a lower compression ratio as a four-cycle with external ignition and either fuel injection or carburetor.

3 Claims, 17 Drawing Figures

Patented Jan. 7, 1975

Patented Jan. 7, 1975     3,858,557

Patented Jan. 7, 1975

60° CRANK ANGLE

FIG. 6

90° CRANK ANGLE

TWO-STAGE ROTARY ENGINE OF TROCHOIDAL TYPE

BACKGROUND OF THE INVENTION

This invention relates to rotary combustion engines of trochoidal type, and more particularly to such engines capable of diesel operation or of being supercharged.

The trochoidal engine as it has become established in the prior art ordinarily comprises a peripheral housing of a basically epitrochoidal profile of two lobes, containing a generally triangular rotor rotatably mounted on an eccentric portion of a shaft with the three rotor apexes continuously sweeping the inner surface of the housing in sealing relation and defining therewith a plurality of chambers of variable volume in which the phases of intake, compression, expansion, and exhaust take place.

Such an engine is not readily suitable for operation in the diesel mode, because of the difficulty of obtaining a high enough compression ratio. The compression can be increased by raising the ratio between the generating radius and the eccentricity of the trochoid (R/e ratio), but this results in a combustion chamber which is shallower and therefore of less favorable shape; it also necessitates a shaft of smaller diameter, and therefore weaker, owing to the fact that the shaft must pass through the smaller phasing gear supported by the side wall.

Various attempts have been made to provide such an engine with a second stage, either to supercharge it or to render it suitable for diesel operation, as in U.S. Pats. No. 3,139,722, 3,228,183, and 3,236,213. In each of those patents two doublelobed trochoids containing three-apexed rotors have been combined, with one trochoidal unit serving as the power unit and the other as a precompressor and postexpander. However, it is impossible with such a system to achieve optimum phasing between the two units for both compression and expansion, and the result has been to favor either the compression side or the exhaust side with a considerable mismatch on the other, or to split the amount of mismatch between the two sides.

U.S. Pat. No. 3,371,654 recognizes the impossibility of phasing two rotors optimally for both intake and exhaust, and attempts to solve the problem by having two power rotors on a single shaft but phased 180° apart, and two compressor-expander rotors on a separate parallel shaft turning at the same speed, the two compressor-expander rotors also phased 180° apart but 90° from the two power rotors. The first compressor feeds gas to the second power unit but is driven by exhaust from the first power unit; the second compressor feeds gas to the first power unit and is driven by exhaust from the second power unit. Such an arrangement causes inordinately long transfer passages with a considerable volume of gas trapped therein, and also makes a bulky, heavy machine.

A still further system is shown in U.S. Pat. No. 3,405,692, wherein enhanced compression is obtained from a reciprocating piston or other compressing device, which inspires its air through the simultaneously inspiring chamber of the power unit and then pumps it back after the intake port is closed. However, this system requires positioning the port of the transfer passage in the power unit midway of the intaking chamber instead of at the beginning thereof, which in turn requires a very long passage with consequent trapping of gas therein.

In British Pat. No. 1,068,209 there is proposed an engine employing a high-pressure power unit having a two-lobed epitrochoid and a three-apexed rotor, with a separate low-pressure compressor unit and a separate expander, each consisting of a onelobed trochoid with a two-apexed rotor therein. The rotors of the three units turn in the same plane on parallel shafts, which are geared together and turning at the same speed.

The engine of this British patent has a number of difficulties which are avoided by the present invention. The displacements of the low-pressure compressor unit and the low-pressure expander unit are identical. Substantial power losses are incurred in transferring the combustion gases from the power unit to an expander unit of the same displacement as the compressor, and full advantage cannot be taken of the energy contained in the exhaust gas, in an expander of the same size as the compressor; it is discharged before it is adequately expanded. The British engine has identical volume ratios in the low-pressure compressor and the low-pressure expander; although mention is made of the possibility of their having different ratios, there is no disclosure of any means by which this may be achieved. Further, in the low-pressure compressor a certain amount of the air compressed therein is necessarily carried around by the rotor past the transfer port, and as soon as the peripheral inlet port is opened by the rotor this compressed air discharges therethrough to atmosphere, thereby losing the compression work put into it.

SUMMARY OF THE INVENTION

This invention presents an improvement of the concept of the three-unit compound trochoidal engine, by providing improved port positioning and timing, with a consequent increase in cycle efficiency. Also, it provides an expander unit of greater displacement than the compressor unit, applicants having found that the losses incurred in transferring the combustion gases from the power unit to the expander, and the magnitude of the negative work of the power unit in pumping against the restriction of its exhaust aperture, are materially reduced if the displacement of the expander is made substantially larger than that of the compressor. Further, this invention provides an expander unit having a higher volumetric ratio than that of the compressor, enabling the retrieval of additional work from the extended expansion. This is accomplished by reducing the profile of the low-pressure compressor rotor relative to the profile of the low-pressure expander rotor. Additionally, applicants provide a means of recovering a large part of the work expended in compressing that portion of initial charge which the compressor rotor carries around past the transfer passage. This is achieved by using a side intake port, suitably contoured and positioned, in the low-pressure compressor, which enables such diverted compressed charge to re-expand and drive the compressor rotor before the side port opens, rather than dumping such charge in its compressed state to atmosphere through the peripheral port of the prior art.

It is therefore an object of this invention to provide an improved compound engine of trochoidal type.

It is another object to provide a trochoidal rotary engine suitable for diesel operation.

A further object is to provide a trochoidal rotary engine suitable for supercharged operation in the Otto mode.

Still another object is to provide a trochoidal rotary engine suitable for operation in the hybrid mode.

A still further object is to provide a three-unit compound rotary engine having improved cycle efficiency.

Yet another object is to provide such an engine having an improved power output.

These objects and advantages and others ancillary thereto will be understood on reading the following specification in connection with the accompanying drawings.

DESCRIPTION OF A PREFERRED EMBODIMENT

Terminology

MAXIMUM VOLUME ($V_{max}$) of a working chamber of a trochoidal rotary machine is that volume between one working face of the rotor and the trochoid wall when the rotor position is such that that working face is at the greatest possible distance from the trochoid wall.

MINIMUM VOLUME ($V_{min}$) of a working chamber of a trochoidal rotary machine is that volume between a rotor working face and the trochoid wall when that working face has made the closest possible approach to the trochoid wall.

DISPLACEMENT (D) is equal to the maximum volume minus the minimum volume: $D = V_{max} - V_{min}$.

VOLUME RATIO (VR) of a trochoidal rotary machine is the ratio of the maximum volume to the minimum volume: $VR = V_{max}V_{min}$.

Figure 1:
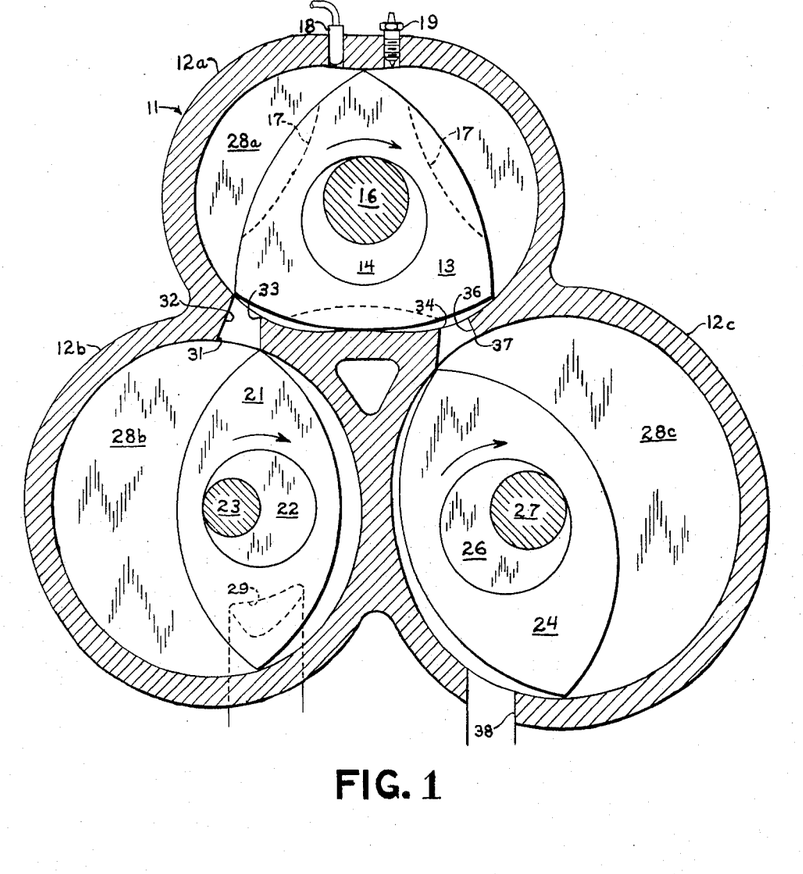
FIG. 1 is a semischematic view in cross-section of the compound engine of the invention with the three units on separate parallel shafts.

FIG. 1 shows semischematically a compound engine 11 according to the invention, omitting conventional details such as bearings, seals, cooling arrangements, indexing gears, and other matters not essential to an understanding of the invention. The engine of FIG. 1 comprises a conjoint peripheral housing having a two-lobed trochoidal portion 12a for the power unit, a one-lobed trochoidal portion 12b for the low-pressure compressor unit, and a one-lobed trochoidal portion 12c for the low-pressure expander unit. The compound engine may also be fabricated with a discrete housing for each unit.

The power unit contains a three-apexed triarcuate rotor 13 of conventional type for trochoidal engines within the housing portion 12a, rotatably mounted on an eccentric portion 14 of a rotatable shaft 16. The rotor 13 has a recess 17 in each of its three working faces, each recess forming a part of one of the three working chambers of variable volume developed as the rotor turns within its housing, and serving to transfer gas across the cusp of the epitrochoid. Housing portion 12a of the power unit may also bear one or more fuel injectors 18 at appropriate locations for supplying fuel when the engine is operated in the diesel mode, or in the hybrid mode with external ignition of injection fuel. Housing portion 12a may also bear one or more spark plugs 19 to provide such external ignition, whether the engine is operated with injected fuel or inspires a fuel-air mixture. When it is operated as a supercharged engine with spark ignition, however, it will be designed with lower over-all compression at the firing position than when operated as a diesel, since diesel pressures would fire the mixture without a spark, and at different timing.

The low-pressure compressor housing portion 12b contains a two-apexed biarcuate rotor 21 of lenticular profile rotatably mounted on the eccentric 22 of shaft 23, thereby forming two working chambers of variable volume between the rotor 21 and housing wall 12b. The low-pressure expander housing portion 12c contains a second two-apexed biarcuate rotor 24 rotatably mounted on the eccentric 26 of shaft 27, thereby forming two working chambers of variable volume between the rotor 24 and housing wall 12c. Neither the compressor rotor nor the expander rotor requires any recess in its working faces. In this embodiment the three rotors are disposed for rotation in the same general plane, with all shafts turning at the same speed. All rotors maintain sealing contact by their apex portions with their respective circumferential trochoidal housing portions, and by their sides with the side walls of the housing. Only the rearmost side wall is shown, designated 28a, 28b, and 28c where it closes the housing portions of the power unit, compressor, and expander respectively.

The shaft 16 of the power unit makes three revolutions for each turn of its rotor, and the compressor and expander shafts 23 and 27 each make two revolutions for each turn of their respective rotor, with all three shafts turning the same number of revolutions per minute. These ratios are standard for epitrochoidal rotary engines, each unit having appropriate indexing gearing (not shown) disposed between the rotor and a side housing wall to assist in maintaining phasing between the rotor and the trochoidal peripheral housing during rotation. Since all shafts rotate at the same speed, for one shaft revolution the triarcuate rotor 13 turns 120°, and the biarcuate rotors 21 and 24 each turn 180°.

The compressor is provided with at least one intake port 29 in one or both side walls 28b of housing portion 12b, through which a gaseous initial charge is inspired, such as air or fuel-air mixture. A peripheral outlet port 31 leads into a transfer passage 32 which terminates in an entry port 33 in one lobe of the power unit. The other lobe of the power unit is provided with a discharge port 34 leading into a transfer passage 36 which terminates in an ingress port 37 in the expander. The expander also has an exhaust port 38, disposed so that it does not open to a given chamber until the ingress port has closed to that chamber.

In accordance with the invention, the compressor unit has a greater displacement (D) than the power unit, and the expander has a greater displacement (D) than the compressor, as shown. This relative displacement of the power unit, compressor, and expander is illustrated in FIG. 1 by the varying sizes of the profiles of the epitrochoids, the axial width of these cavities being assumed to be the same. However, the relative displacements of these working chambers may be changed by varying their axial widths in addition to, or in lieu of, varying the trochoidal diameters of the units.

When the compound engine is to be operated as a diesel, the low-pressure compressor should have a displacement at least twice as great as that of the power unit in order to reach satisfactory over-all pressures for diesel operation, and may have a displacement as much as three times as large. When the engine is to be operated as a supercharged engine with external ignition in the Otto mode, pressures in the chamber of the power unit must not be so high as for diesel, or the charge would be fired too early on compression alone, before the spark plug was activated. For such supercharged operation the final compression ratio in the power unit should be from about 10:1 to about 12:1.

In the hybrid mode of operation the low-pressure compressor inspires a charge of fresh air and compresses it into the power unit. At an appropriate time fuel is injected into the working chamber of the power unit to form a fuel-air mixture, which is fired by the spark plug when the desired degree of compression is reached. In this mode the final over-all compression ratio to be attained in the power unit is about the same as for the Otto mode, that is, about 10:1 to about 12:1.

Figure 1A:
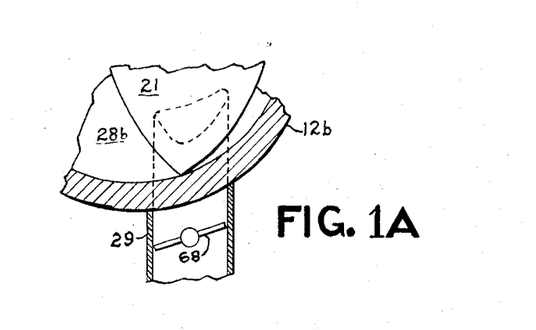
FIG. 1A is a fragmentary view of a portion of FIG. 1, with throttling means provided in the intake port.

Therefore, in order to reduce the final compression ratio to a value suitable for either the hybrid or supercharged modes of operation, while still retaining the low-pressure compressor at the same volume ratio and displacement as would be used in the diesel mode, the compression ratio of the power unit itself may be reduced. This is accomplished by providing larger recesses 17 in the working faces of the power rotor 13, the volume of the recesses being selected such as to reduce the power unit compression ratio to the desired value. It is preferable not to reduce the volumetric ratio of the power unit so far as to provide the desired over-all ratio at wide-open throttle, since this would limit effective operation of the engine to sea level ambient pressure. Rather, it is preferable to provide a suitable volumetric ratio of the power unit such as to result in the desired over-all compression ratio at the lowest ambient pressure contemplated, and provide the low-pressure compressor with a throttle. As shown in FIG. 1A, the compressor intake passage 29 is provided with a throttle 68, whereby the quantity of gaseous intake charge inspired by the low-pressure compressor may be controlled to produce the desired over-all compression ratio.

In the case of an engine which may be required to operate at wide-open throttle in an environment where air pressure remains substantially constant, as in a fixed installation for example, it is possible to provide a compressor of lesser displacement, about 1¼ to 1½ times the displacement of the working chambers of the power unit. Thus, if the compression ratio of the power unit itself is about 8:1, a compressor displacement of 1¼ times that of the power unit will give an over-all compression ratio of 10:1, and a compressor displacement of 1½ times that of the power unit will give an over-all compression ratio of 12:1.

For any of the three modes of operation, diesel, Otto, or hybrid, the low-pressure expander should have a displacement from about 1¼ to 1½ times that of the low-pressure compressor.

The housing portions 12a, 12b, and 12c may be made in conjoint form as shown in FIG. 1 in order to make the transfer passages 32 and 36 as short as possible, but the compound engine of the invention may also be made with separate housings for each unit.

The expander, in addition to having a larger displacement (D) than the compressor, has also a greater volumetric ratio (VR) than that of the compressor. The means by which the difference in volume ratios is achieved will be explained hereinafter.

Figure 2:
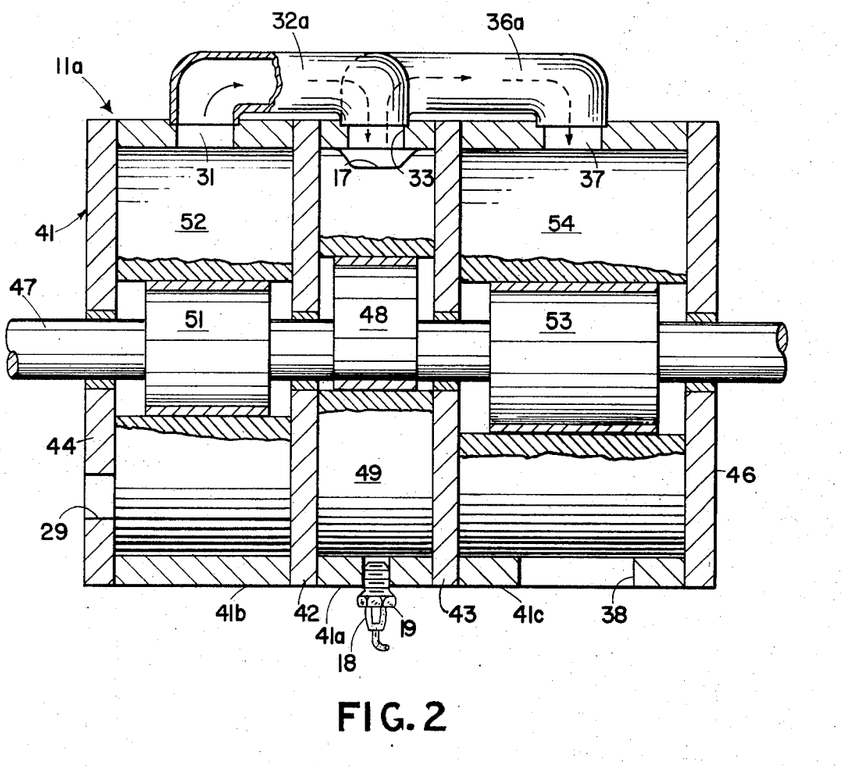
FIG. 2 is a cross-sectional elevation of another embodiment with the three units on a single common shaft.

FIG. 2 shows another embodiment of a compound engine 11a according to the invention, in which the three units have the same operative relationship to each other as in the embodiment described above, but as differently arranged. A central peripheral housing portion 41a has a profile of two-lobed trochoidal shape and is closed axially by intermediate side walls 42 and 43. Abutting wall 42 is a peripheral housing portion 41b of one-lobed trochoidal profile for the low-pressure compressor, which is closed on its axially opposite end by side wall 44. Abutting intermediate side wall 43 is a peripheral housing portion 41c of one-lobed trochoidal profile for the expander, which is closed on its axially opposite end by side wall 46.

A common shaft 47 transpierces all the side walls of the engine, bearing in each of the three discrete cavities an eccentric portion appropriate to its respective unit. The central unit bounded by the two-lobed trochoidal wall 41a is the power unit, and the shaft 47 bears in the power unit an eccentric portion 48 on which is rotatably mounted a three-apexed triarcuate power rotor 49.

The compressor bounded by peripheral wall 41b is of greater axial extent than the power unit in order to obtain the desired larger displacement, but has the same vertical dimension. The width in the horizontal dimension transverse to the axis, at least at the inner peripheral surface, cannot be the same as that of the power unit owing to the difference in the shape of their profiles. It is to be understood that the terms vertical and horizontal as used in this connection refer only to the appearance as shown in the drawings, since the engine may be spatially oriented in any desired manner.

Within the compressor cavity the shaft 47 bears an eccentric portion 51 on which is mounted a two-apexed biarcuate compressor rotor 52. Side wall 44 has therein an intake port 29 of the same shape as that shown in FIG. 1 and disposed in the same relation to the rotor and the trochoidal inner surface of the housing. A second side intake port (not shown) can be provided in wall 42 by forming a passage therein extending to the radial edge of the wall. A peripheral outlet port 31 is provided in housing portion 41b, disposed in the same angular relation as the corresponding outlet portion in FIG. 1, and opening into transfer passage 32a, which in this embodiment may be formed by a tubular member external to the housing. The transfer passages of this embodiment may also be formed within the housing walls.

Passage 32a leads to entry port 33 in one lobe of the power unit. In this embodiment the power rotor 49 and its eccentric 48 are disposed 180° apart from the position shown in FIG. 1, which allows the positioning of all ports in the engine in the same angular relationships as in the previous embodiment. The peripheral wall 41a of the power unit bears a fuel injection 18 or a spark plug 19 or both, as in FIG. 1. The other lobe of the power unit has a discharge port 34 (not shown in FIG. 2) opening into transfer passage 36a which leads to ingress port 37 in the expander.

Within the expander cavity the shaft 47 bears an eccentric portion 53 on which is mounted a two-apexed lenticular rotor 54. The expander unit and its rotor are of still greater axial extent than the compressor unit, having therefore large displacement. The expander has a peripheral exhaust port 38.

The operation of the compound engine will be explained with reference to FIGS. 3-8, in which the profiles of the epitrochoids of the compressor and the expander are shown of equal size for convenience of illustration. However, as in FIG. 2 the axial width of the expander is made greater than that of the compressor in order to provide the expander with the greater displacement. The working faces of the power rotor are indicated as $a$, $b$, $c$ and maintain their designations throughout, in order that their successive positions can be followed through the cycle depicted. The working faces of the compressor rotor and the expander rotor are each designated as $a$ and $b$, and also maintain these designations throughout.

Figure 3:
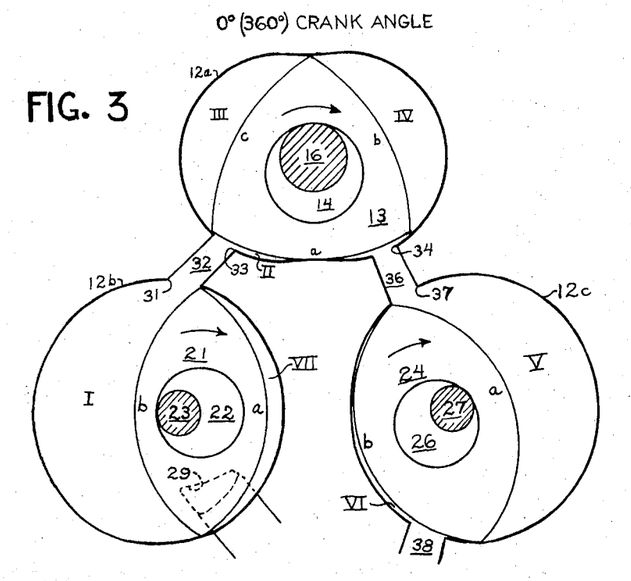
FIGS. 3–8 show the rotor positions of the three units at successive angles of shaft rotation.

FIG. 3 illustrates zero crank angle of the power unit, that is, the triarcuate rotor 13 is symmetrically disposed within the epitrochoid, with its working face $a$ bisected by one cusp of the trochoid and two of its apexes spanning the entry port 33 and the discharge port 34, the other apex being at the opposite cusp of the trochoid. The ports 33 and 34, however, are not symmetrically positioned with respect to the cusp of the trochoid, entry port 33 being 30° of crank rotation further from the cusp than discharge port 34. The working chamber defined between working face $a$ and the housing wall is a minimum volume.

The compressor unit is also at zero crank angle, with its working chamber on the lefthand side of the illustration, defined between housing wall 12b and working face $b$ of the rotor, being at maximum volume, and its other working chamber, on the righthand side between the housing wall and working face $a$, being at minimum volume. The positions of outlet port 31 and intake port 29 are such that at zero angle the clockwise rotation of the rotor has just fully opened outlet port 31 to the chamber which is at maximum volume, and the side intake port 29 is closed to both chambers by a side face of the rotor.

The expander in FIG. 3 is shown at 30° before zero crank angle (of its own crank). The positions of ports 37 and 38 are such that at this crank angle one apex of the rotor 24 is about to begin closing ingress port 37 to the larger working chamber and open it to the other and then smaller working chamber, and with exhaust port 38 near closing to the then smaller working chamber and approaching opening to the larger working chamber. Maximum volume of the working chamber between working face $a$ and the housing wall 12c has not yet been reached, nor has minimum volume of the working chamber between face $b$ and the housing wall. The expander crank 27 therefore lags behind (about 30° as illustrated) the cranks of the compressor and the power unit. This arrangement is such that when the working chambers of the expander have reached their maximum-minimum positions in another 30° of crank rotation (shown in FIG. 4) ingress port 37 will have just fully opened to the expander minimum chamber between working face $b$ and housing wall 12c, and discharge port 34 of the power unit will be just on the point of opening the expanding chamber of the power unit to the transfer passage 36 between the power unit and the expander. These angular relations of the cranks of the three units are maintained during operation, since all cranks are either geared together (shown in FIG. 9) at the same speed, or the three units are mounted on a common crank as shown in FIG. 2, with the eccentrics positioned at the selected angles on the shaft.

It will be observed in FIGS. 3-8 that the compressor rotor 21 and the expander rotor 24 are not of equal widths across the minor diameters of their lenticular profiles, the compressor rotor being substantially narrower. Thus, at minimum volume its working faces cannot make so close an approach to the trochoidal wall as can the rotor 24 of the expander. This results in the expander having a substantially greater volume ratio than that of the compressor. Other methods of varying the volume ratios of the compressor and expander are shown in FIGS. 10-15.

Figure 4:
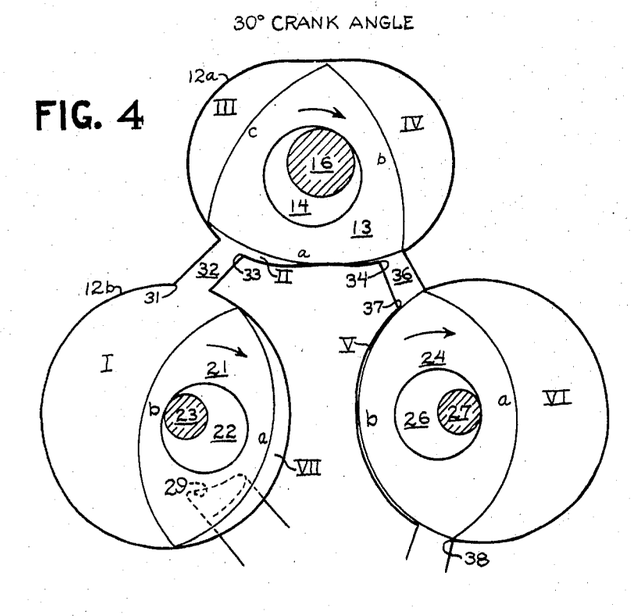

The rotor 24 of the expander is shown in its minimum-maximum volume position in FIG. 4. Rotor 24 is made as wide as possible across its minor diameter, that is, having the largest possible minor diameter of its profile which will rotate within the given epitrochoid, so that its working faces at minimum volume approach the trochoid wall almost to contact, with only working clearance remaining. The volume ratio of the expander is $EVR = EV_{max}/EV_{min}$, and its displacement is $ED = EV_{max} - EV_{min}$. As an example of these relationships, if the maximum volume of the expander is 64 cubic inches and the minimum volume is 4 cubic inches, the expansion ratio will be 16 and the displacement 60 cubic inches.

The volume ratio and displacement of the compressor are computed in the same way, $CVR = CV_{max}/CV_{min}$, and its displacement is $CD = CV_{max} - CV_{min}$. In a compressor of the same trochoidal dimensions and axial length as the expander, the minor diameter of the rotor may be diminished by an amount which results in a maximum volume of 68 cubic inches and a minimum volume of 8 cubic inches. The compressor displacement (CD) is still 60 cubic inches, but the volume ratio (CVR) is only 8.5. The specific displacements and volume ratios given are only for illustration of the relationships, since it is contemplated that they may be varied in either direction according to design, service requirements, and mode of operation of the engine.

The compression ratio of the compressor has a relatively minor effect on the over-all compression ration of the compound engine, the principal effect being from the displacement of the compressor as compared to the displacement of the power unit. Therefore, providing a high expansion ratio in the expander allows extracting additional work from the extended expansion which results.

In the following description of the operative cycle all positions will be described in terms of shaft angles of the power unit. It is to be borne in mind that the compressor unit has the same shaft angle as the power unit, and the expander shaft lags 30° behind the power unit. However, there are three revolutions of the power shaft to each turn of the power rotor, whereas in both the compressor and the expander only two shaft revolutions are required for each turn of those rotors. These relationships result in the compressor working chamber developed by each 180° of rotation of the compressor shaft feeding compressed gas to a power chamber developed by each 120° of rotation of the power unit shaft, and each expanding chamber of the power unit discharging its gases into an expanding chamber of the low-pressure expander unit at each 180° of revolution of the expander shaft.

In FIG. 3 at zero angle chamber I of the compressor has reached maximum volume and thus contains a full charge of whatever gas or gaseous mixture of air and fuel has been inspired through intake port 29. The rotor 21 has closed intake port 29 and has just fully opened outlet port 31 to chamber I. Rotor 13 of the power unit has just fully opened entry port 33 to chamber II of the power unit, which chamber is at its minimum volume, so that there is communication between chambers I and II, but no substantial transfer of the intake charge has yet occurred. All ports in the compound engine, with the exception of intake port 29, are preferably sized to require 30° of shaft rotation between beginning to open and fully open, and 30° of shaft rotation between beginning to close and fully closed. This angular extent of the ports allows adequate port area for gas transfer without presenting inconveniently restricted orifices, without too great an angular intrusion of the ports into the chamber wall in either direction, and without too great an axial extent. The same port area could be achieved by greater angular dimensions and smaller axial dimensions, but this would require that too great an angular portion of the peripheral chamber wall be perforated. Likewise, the area could be maintained with less angular extent and greater axial extent, but such a slitlike aperture would leave a greater length of the apex sealing strips borne by the rotor tips unconfined during their passage across the ports, with a consequent risk of distortion of the seal strip into the port. An effective compromise between these extremes is reached by sizing the ports to about 30° in the angular direction. However, a certain tolerance may be allowed for manufacturing reasons, about plus or minus 5° being suitable either in angular extent or angular positioning of the ports, without markedly affecting the efficiency of the cycle.

Figure 5:
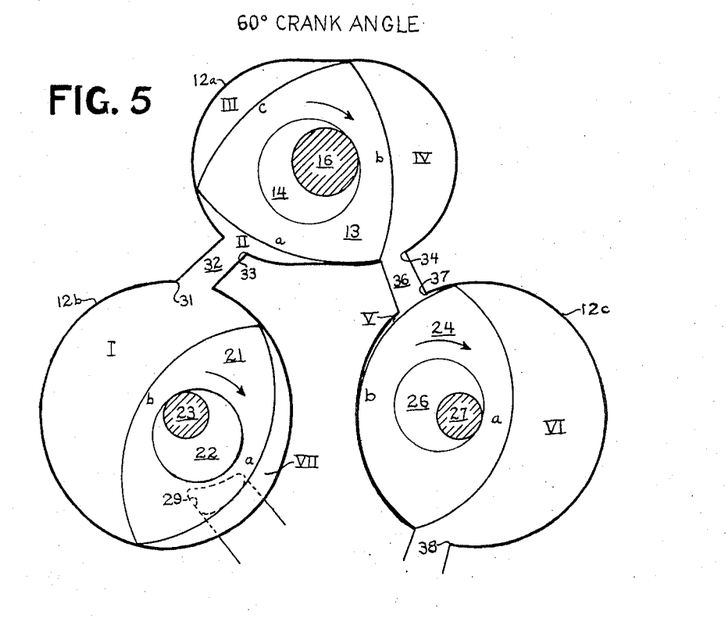

FIG. 4 shows the positions at 30° crank angle. Transfer of charge from chamber I to chamber II has begun, but is not yet far advanced. Meanwhile, chamber VII of the compressor has begun to expand from the minimum volume shown in FIG. 3, but the rotor has not yet opened intake port 29, for a reason to be explained below. In FIG. 5, at the 60° position, transfer is continuing between chambers I and II with the intake charge being compressed. Rotor 21 of the compressor has reached a position where the curved edge of its working face *a* is just congruent to the curvature of the outer edge of intake port 29, which is therefore about to open to chamber VII, which has now further increased in size.

Figure 6:
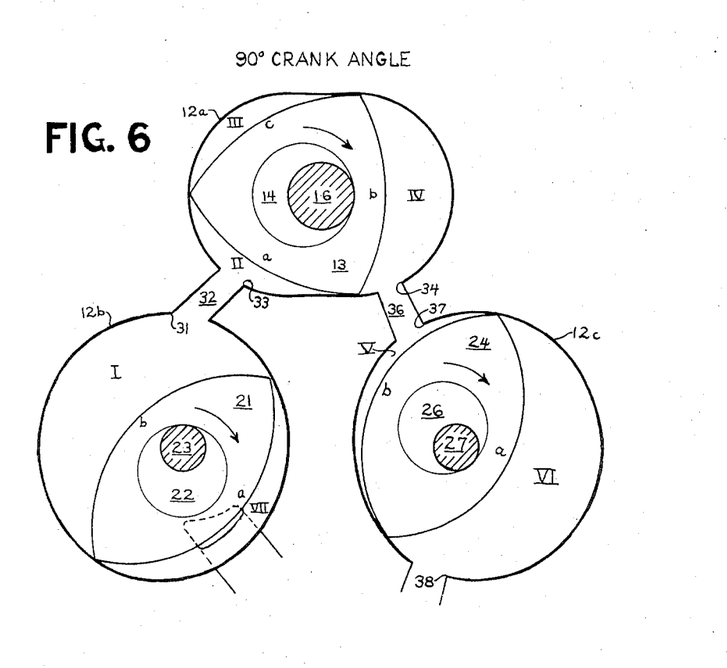
Figure 7:
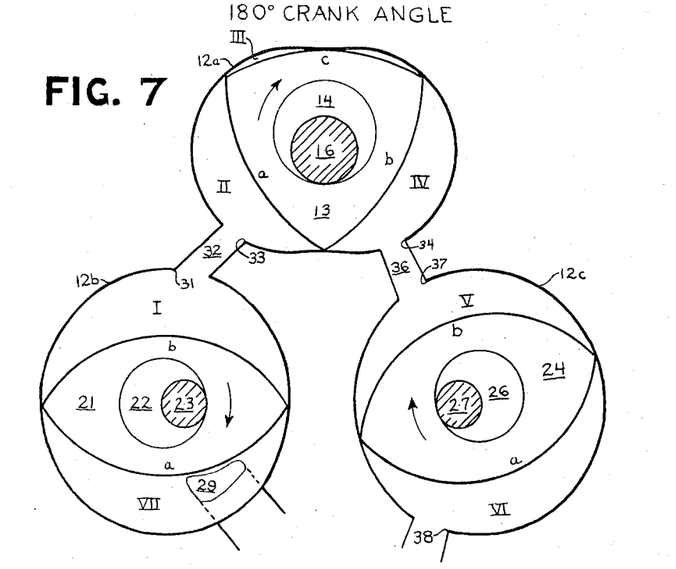

In the 90° position of FIG. 6 transfer between I and II is continuing with increased compression. Intake port 29 is partially open to chamber VII, which has therefore begun its intake phase. In FIG. 7 at 180°, although chamber II in the power unit has considerably enlarged, chamber I in the compressor has diminished at a more rapid rate, the combined volume of the two chambers is less than the original volume of chamber I, and the charge is under significant compression. The actual degree of compression will depend on the relative displacement of the compressor and the power unit.

Figure 8:
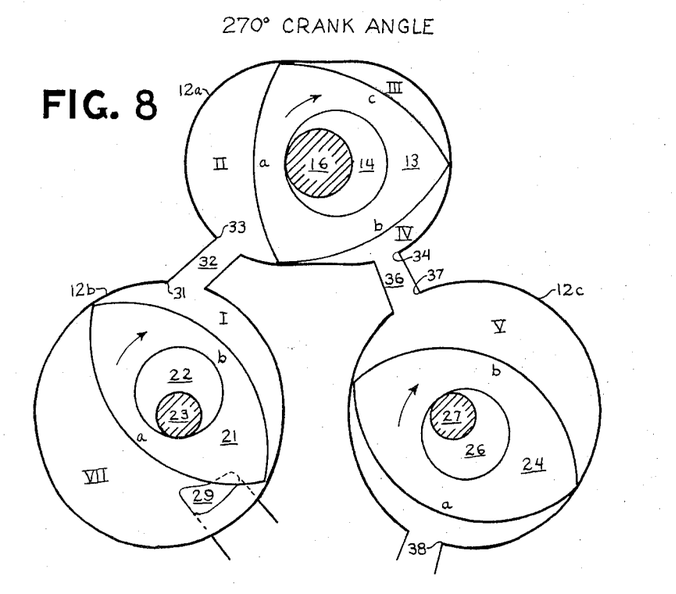

In FIG. 8 chamber II in the power unit has reached its maximum volume and most of the charge has been transferred to it. In a further rotation of 60° the rotor tip of the compressor will reach the edge of outlet port 31 and the port will begin to close. At the same time the rotor tip of the power unit at the trailing portion of chamber II will begin to close entry port 33 to chamber II. In a still further rotation of 30° the crank will have made one full revolution and the relative position of FIG. 3 will have again been reached, except that the chambers in those positions will now be defined between the housing walls and the next following rotor faces.

Returning to FIG. 3, the chamber which has been followed as II thus far now becomes chamber III, and the original chamber I in the compressor will now have moved around to become chamber VII. It will be evident that between the positions of FIG. 8 and the return of FIG. 3, some of the original charge in chamber I will have been carried past outlet port 31 without having been pumped through transfer passage 32, and that this remaining portion of charge is under compression in chamber VII. In FIG. 3 the outlet port 31 has been closed to chamber VII and the intake port not yet opened, and the compression remainder of charge is trapped between the rotor face and the housing wall.

It is inevitable that with a unilobed trochoid and a twoapexed rotor some portion of the initial charge inspired will be carried past the transfer passage, in a compressed state. In the prior art, wherein the compressor has a peripheral intake port, this remainder of compressed charge was lost out the intake port as soon as the advancing rotor tip opened the port to the chamber containing the bypassed charge. This opening would normally take place just about at the position shown in FIG. 3, when the chamber VII containing the charge remainder is at minimum volume and consequently the remaining charge portion would be at its highest state of compression. Thus the work expended in compressing that portion was lost.

With the side port of the present invention, chamber VII containing the charge remainder stays closed from the position of minimum volume in FIG. 3 for another 60° of shaft rotation, until it reaches the position of FIG. 5. During this period the chamber is developing in size and the compressed charge is exerting its pressure in the direction of rotation to aid in the chamber development, so that a portion of the work expended is recovered. At the position of FIG. 5 chamber VII has been developed to approximately twice the minimum volume, and the charge remainder therein has dropped to approximately atmospheric pressure. Hence, there is no sudden blowdown of a pressurized chamber to create a hiatus in the smooth flow characteristics of the engine. Neither is there any similar but opposite hiatus of a chamber which has been pulling a vacuum suddenly opening to atmosphere, as has occured in the prior art.

This deficiency in prior art devices could not have been satisfactorily corrected by positioning a peripheral port to open to chamber VII only after 60° of development, since in that case such an alternately positioned peripheral port could not close to the preceding chamber I until still later in the cycle, at a time when chamber I would have considerably diminished in volume without yet having pumped any of its charge into chamber II, being unable to compress owing to its being still open to atmosphere.

In the present invention the generally triangular side intake port or ports 29 have an arcuate edge at the radially outer side, which is the opening edge of the port, with approximately the same degree of curvature as the profile of the rotor, and positioned radially inwardly from the inner surface of the trochoidal wall at such a distance that the edge of the rotor working face will lie approximately congruent to the opening edge of the port at the position of 60° crank angle. The closing edge of intake port 29 is positioned so that the rotor side face will close it 30° before zero crank angle, that is, at 330°, which is the position at which outlet port 31 begins to open to chamber I. The closing edge of port 29 may be curved to match the rotor curvature or may be straight. A precise match is less important at this edge, since in the closing position one of the pointed ends of rotor 21 will be swinging rapidly across the port. The radially inner edge of port 29 may be of any convenient configuration, and as shown it is curved and positioned so as to be radially outside of the path of travel of the oil seals (not shown) borne by the rotor side faces.

Returning to the operative cycle at FIG. 3, the intake charge which was transferred and compressed into the power unit is now wholly contained in chamber III. It undergoes further compression in chamber III through the successive stages shown, until the power rotor reaches the position of FIG. 7, or approximately that position.

This is the position of maximum compression, and at that time, or in some cases slightly before that position, a fuel injection is made into the chamber by injector 18 if the engine is operating as a diesel or as a hybrid, and ignition occurs. If the engine is operating as a supercharged engine in either the Otto or the hybrid mode the spark plug 19 fires.

Chamber III then begins to expand under pressure of the combustion gases, through the position shown in FIG. 8, and is thereafter designated as chamber IV. Expansion of chamber IV continues through the positions of FIGS. 3 and 4, at which time the power rotor is just on the point of opening discharge port 34 leading to transfer passage 36. The rotor 24 of the expander has just completed opening ingress port 37 to chamber V of the expander which is just then at its minimum volume.

In a further 30° of shaft rotation as shown in FIG. 5 discharge port 34 of the power unit is fully open and exhaust gases are passing through the transfer passage and exerting working pressure on rotor 24. This timing of the discharge port 34 and ingress port 37 insures that at the very beginning of exhaust transfer there will be enough of the working face of rotor 24 exposed for the exhaust gases to exert a power thrust. It also precludes the possibility of any overlap whereby some portion of gas from the power unit could be discharged into a fully developed expander chamber in which the exhaust port was open to atmosphere, thus losing some power. Positioning port 34 at 30° further centerward than the entry port 33 in the other lobe of the power unit allows full development of the expanding chamber in the power unit and extracting its full work potential before its discharge port opens to the expander.

Chamber V of the expander then continues to expand under the thrust of the combustion gases and drives the expander rotor through the positions of FIGS. 6 to 8 and FIGS. 3 and 4, whereupon it is designated VI. In the latter position chamber VI has reached maximum volume, no more work can be extracted from the exhaust gases, and rotor 24 has closed ingress port 34 to chamber VI and is on the point of opening exhaust port 38 to discharge the gas to atmosphere. Chamber VI continues exhausting to atmosphere through FIGS. 5 to 8, and has nearly completed its cycle as shown again in FIG. 3.

The same sequence of events will of course have been concurrently taking place in each chamber as it successively comes into the positions described, each half revolution of the compressor rotor feeding one chamber of the power unit, and each expanding chamber of the power unit feeding a chamber of the low-pressure expander.

Figure 9:
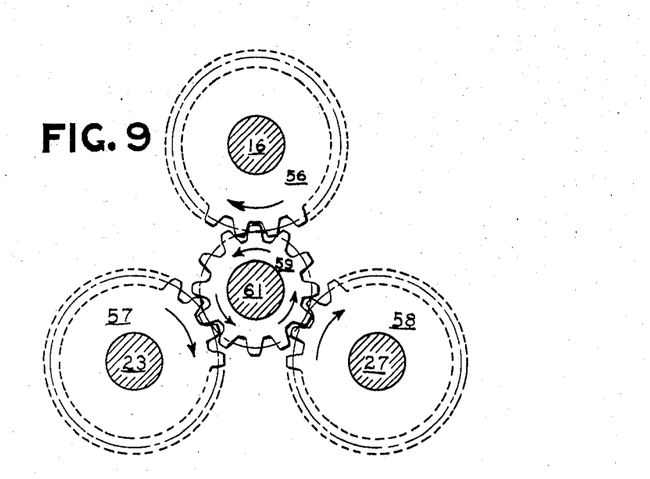
FIG. 9 is a gearing arrangement for maintaining the three parallel shafts in phase.

FIG. 9 shows a means of maintaining the shafts of the three units of the compound engine in phase when the rotors are mounted on separate parallel shafts. Shafts 16, 23, and 27 of the power unit, compressor, and expander respectively bear gears 56, 57, and 58 of the same pitch diameter. These gears are all in mesh with an idler gear 59 mounted on a stub shaft 61, which arrangement insures that all engine units rotate in the same direction at the same shaft speed. When the engine units are mounted on a common shaft as in the embodiment of FIG. 2 no such arrangement is required, and the rotors are phased at the correct crank angles by the positioning of their eccentrics on the shaft, and maintained so by the indexing gears (not shown) which are conventional in trochoidal machines. Power may be taken off from shaft 47 in the embodiment of FIG. 2, or from any of the four shafts shown in FIG. 9.

The volumetric ratio of the low-pressure compressor can be varied within limits by appropriate design of the rotor. If it is desired to lower the compressor volume ratio from that shown in FIGS. 1 and 3–8, the profile of rotor 21 may be made still narrower across its minor diameter and the intake port positioned further radially inwardly, at the same time adjusting the positioning of the closing edge of the port. To raise the ratio, the rotor may be made wider and the port moved radially outwardly.

When the position of the side intake ports 29 is already fixed, and in the case wherein it is desired to alter the volume ratio of an existing low-pressure compressor, the compressor rotor may be modified to raise or lower the ratio, as shown in FIGS. 10–15.

Figure 10:
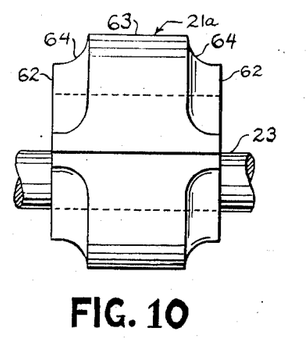
FIGS. 10–15 show modifications of the low-pressure compressor rotor.
Figure 11:
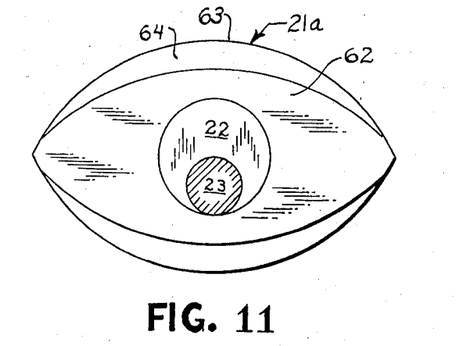

FIGS. 10 and 11 are views of such a modified rotor to increase the volume ratio over that shown in FIg. 1 for example, while retaining the intake ports in the same position. FIG. 10 is an end elevation looking along the rotor from one of its apexes, and FIG. 11 is a side elevation. The axially disposed slots which would extend along the apexes for holding the apex seals are omitted, as are the side slots on the side faces of the rotor for side seals.

The side faces 62 of rotor 21a remain of the same dimensions as previously described, and thus open and close the intake ports 29 at the same angular positions as before, without moving or altering the ports. The rotor being of the same length as before, its apexes will control outlet port 31 as previously described. However, the center portion 63 of the rotor, axially between the side faces, is of broader profile across the minor lenticular diameter than the side faces 62. The additional width of center portion 63 may be filleted off in the axial direction as at 64 to the contour of the side faces 62, or may be chamfered or cut or otherwise reduced from the wide profile of center portion 63 toward the side faces 62. This reduces the minimum and maximum volumes of such a compressor as shown in FIG. 1, and hence increases the volume ratio.

Figure 12:
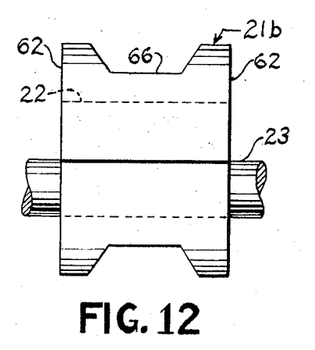
Figure 13:
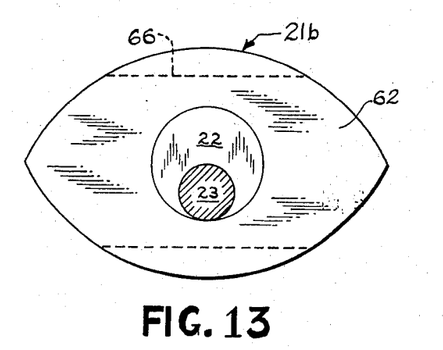

FIGS. 12 and 13 exemplify a rotor modification whereby the volume ratio of such a compressor as shown in FIG. 1 may be still further lowered. Rotor 21b has side faces 62 of correct dimensions for controlling the intake port 29 as in FIG. 1, and is of the proper length for the apexes to control the outlet port. A recess 66 is produced in each working face between the side faces 62, recess 66 having a bottom which is straight in a direction parallel to the longer diameter of the lenticular profile. The center portion of the rotor is thus of a narrower dimension than the side faces 62, thus increasing both the minimum and maximum volumes of the compressor and therefore lowering the volume ratio.

Figure 14:
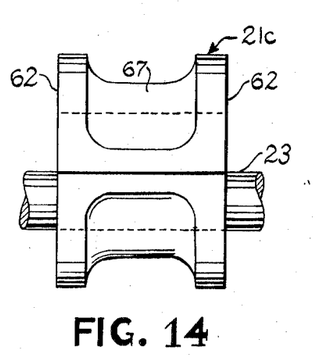
Figure 15:
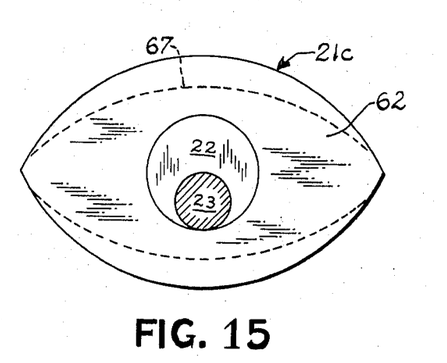

FIGS. 14 and 15 show a rotor modification having the same effect as that of FIG. 12 and 13, but in greater degree. A recess 67 is produced in each working face of the rotor as in FIG. 12, but instead of having a straight bottom parallel to the long diameter of the lenticular profile, recess 67 has a bottom curved toward the apexes of the rotor, thus increasing its length beyond the length of recess 66 in FIGS. 12 and 13, and therefore increasing the minimum and maximum volumes to a still greater extent and hence lowering the volume ratio still further.

Modifications of the same types may of course also be practiced on the rotor of the expander unit, should it be desired to alter its volume ratio.

Figure 16:
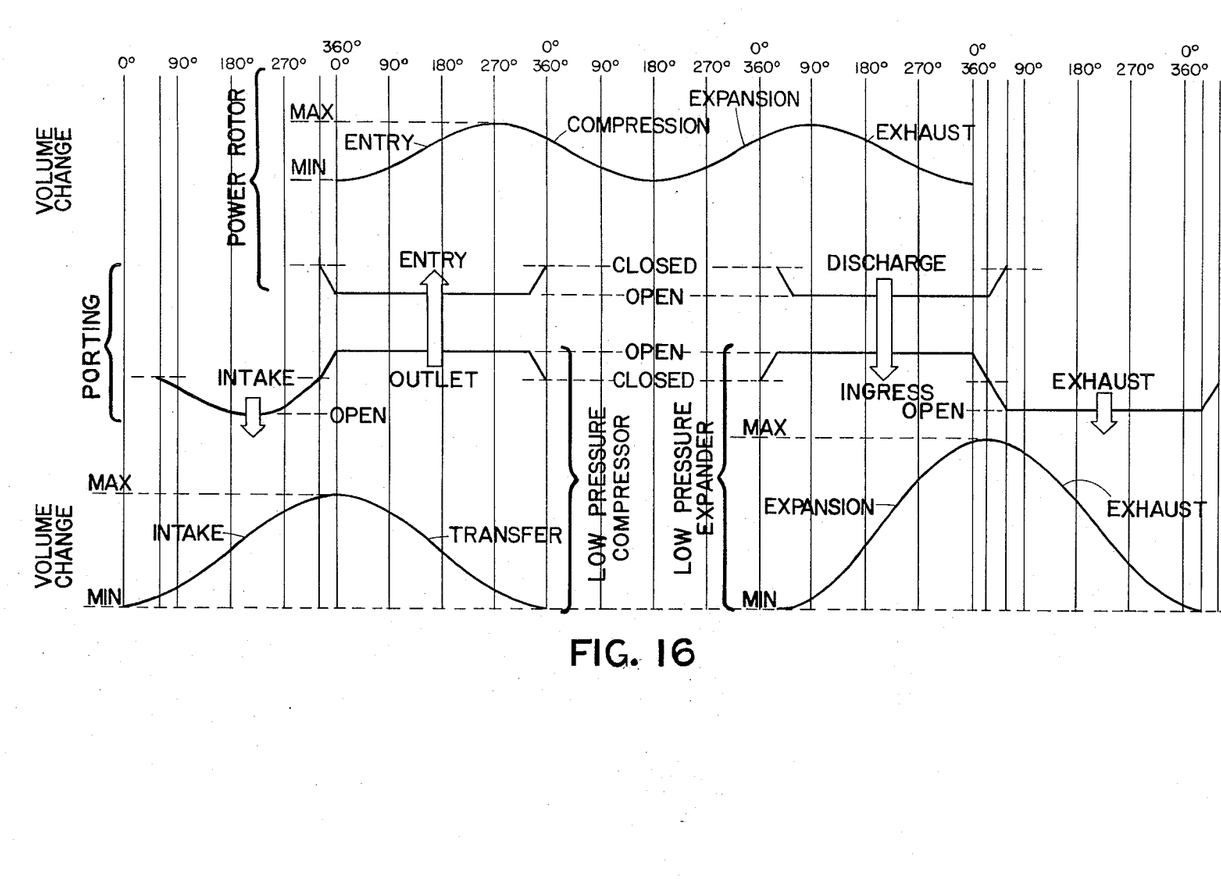
FIG. 16 is a graph of the phasing and port timing of the three rotors.

FIG. 16 shows a consolidated graph of the phasing and port timing of all three units of the compound engine, whether the units are arranged on parallel shafts or axially in line on a common shaft. Only a single cycle is shown for a single chamber of each of the three units, in its proper phase relation to the cycles of the other two, but it is to be understood that portions of the cycles for other chambers are occurring concurrently, and if shown would have curves overlapping those now present in FIG. 16. Such overlapping curves have been omitted for clarity in understanding the operation of the machine. The degrees of rotation shown are angles of shaft rotation of the power unit, and it is to be borne in mind that all shafts turn at the same rate, the compressor has the same shaft angle as the power unit, the expander lags 30° behind the compressor and power units, and that three rotations of the power shaft are required for one turn of its rotor, and two shaft rotations for one turn of the compressor and expander rotors.

The chamber of the low-pressure compressor is at minimum volume at 0° and expands in volume with rotation from that position. During the first 60° of rotation the intake port is not open, and the expansion is of the compressed gas from a previous cycle which is trapped in the closed minimum chamber. At 60° such gas has returned to approximately atmospheric pressure, and the intake port opens. It has a somewhat gradual opening curve, owing to the increasingly larger area of the side intake port uncovered by movement of the long curved edge of the low-pressure compressor rotor (working face a in FIGS. 5 and 6).

The slope of the closing curve of the intake port is somewhat steeper than the opening, owing to the more rapid swing of the pointed end of the compressor rotor across the port opening (working face a in FIG. 8). At the moment when the intake port becomes fully closed, the outlet port of the compressor and the entry port of the power unit both begin to open. These opening processes have straight-line slopes of short duration as shown in FIG. 16, since they are peripheral ports controlled by the passing of the rotor apexes, which requires only 30° of shaft rotation. Transfer of the intake charge from the compressor to the power unit begins with opening of these ports and continues through one full crank rotation. That is, the ports begin to open at 330°, are fully open at 360° (or 0°), begin to close after another 330°, and are fully closed at 360°0 again.

During this period the intake charge is being transferred, and is being compressed in the chamber of the low-pressure compressor and also in the chamber of the power unit. By the time the ports close the charge has been fully transferred to the power unit, with the exception of the minor portion carried past the outlet port of the low-pressure compressor; thereafter it is further compressed in the power unit for another 180°. The degree of compression attained depends on the relative displacements and compression ratios of the compressor and the power unit, which parameters may vary according to the design of the compound engine and the use for which it is intended. When the engine is intended for diesel operation the displacements and volumetric ratios will be so chosen as to provide at least the minimum degree of final compression required for stable diesel operation. When intended for hybrid or supercharged operation with external ignition, the parameters will be selected to give a lower over-all compression than would be used in diesel operation, and the compressor may be throttled to give the desired final compression.

Firing may take place at maximum compression in the power unit, or may be either advanced or retarded according to desired operating conditions. Expansion in the power unit begins at 180° and continues for 270°, that is, until the maximum chamber volume of the power unit is reached at the 90° position of the shaft. However, the discharge port of the power unit begins opening at 30° and is fully open at 60°, the ingress port of the low-pressure expander having opened 30° earlier.

From the point at which both ports are open, transfer of combustion gases from the power unit to the expander begins, and expansion occurs in both units until the ports close. It is during this period of transfer of the combustion gases that the large chamber of the low-pressure expander exerts a particular advantage. The gas from the power unit chamber is of course required to pass through a throttling restriction, the transfer port. However, the flow rate between two chambers is a function not only of the flow area connecting the chambers, but also of the volume ratio between the two chambers, and the pressure differential between the chambers, with the flow rate into the receiving chamber increasing as the volume of the receiving chamber increases relative to the exhausting chamber.

The provision of a low-pressure expander having a larger displacement than the low-pressure compressor, according to the invention, allows such optimum flow rate of the combustion gases from the power unit to the large chamber of the expander unit, reducing the negative work of the power unit in pumping exhaust gases through the restriction of the transfer passage, and producing an increase in cycle work and efficiency. Further, the use of an expander having a higher volumetric ratio than the compressor, according to the invention, allows greater work retrieval from the compound engine, in that the higher volumetric ratio of the low-pressure expander and its extended expansion cycle provide extended expansion of the combustion gases to a lower pressure than would be achieved by an expander of the same volumetric ratio and displacement as the low-pressure compressor. This results in the recovery of more work.

It will be seen from FIG. 16 that in the present invention there is smooth flow through all three units of the compound engine, there being no hiatus as in the prior art where one unit is pumping into a passage the further port of which has not yet opened, nor any hiatus where any chamber is pulling a low pressure on a passage wherein the preceding port is not open. Neither are there sudden pulses where the rapid opening of a peripheral port is not matched by a corresponding opening of another port in the flow path, as in the prior art, nor is there any occurrence of a sudden blowdown to atmosphere of any pressurized or partially pressurized chamber. Although the flow characteristics are shown in FIG. 16 precisely in their preferred angular relationship, minor shifts of a few degrees in angular relation will not markedly impair the operating characteristics.

What is claimed is:

1. A compound rotary internal combustion engine of trochoidal type having a low-pressure compressor unit for inspiring a gaseous intake charge and compressing it, a power unit receiving the charge from the low-pressure compressor and compressing it further, the power unit having means for igniting the charge at a high degree of compression and being driven by expansion of the resulting combustion gases, and a low-pressure expander unit receiving the combustion gases from the power unit and being driven thereby through further expansion thereof, wherein the improvement comprises:
   a. the low-pressure compressor having a larger displacement than the displacement of the power unit;
   b. the low-pressure expander unit having a displacement about 25 percent to about 50 percent larger than the displacement of the compressor unit;
   c. the low-pressure expander having a higher volumetric ratio than the volumetric ratio of the low-pressure compressor;
   d. the minimum volume of the compressor unit being substantially larger than the minimum volume of the expander unit;
   e. the compressor unit having a side intake port in at least one side wall, the intake port being controlled by a side face of the compressor rotor; and
   f. at zero degrees of rotation of the compressor shaft the intake port being closed to both compressor chambers.

2. The combination recited in claim 1, wherein a portion of the charge inspired by the compressor chamber of increasing volume is carried in the compressed state past the compressor outlet port into the compressor chamber of decreasing volume and re-expands in the latter chamber exerting driving force on the compressor rotor to recover a portion of the compression energy until the intake port opens to that chamber.

3. The combination recited in claim 2, wherein the intake port remains closed to the compressor chamber containing the reexpanding charge until 60° of rotation of the compressor shaft past the zero position.

* * * * *